Figure 3:
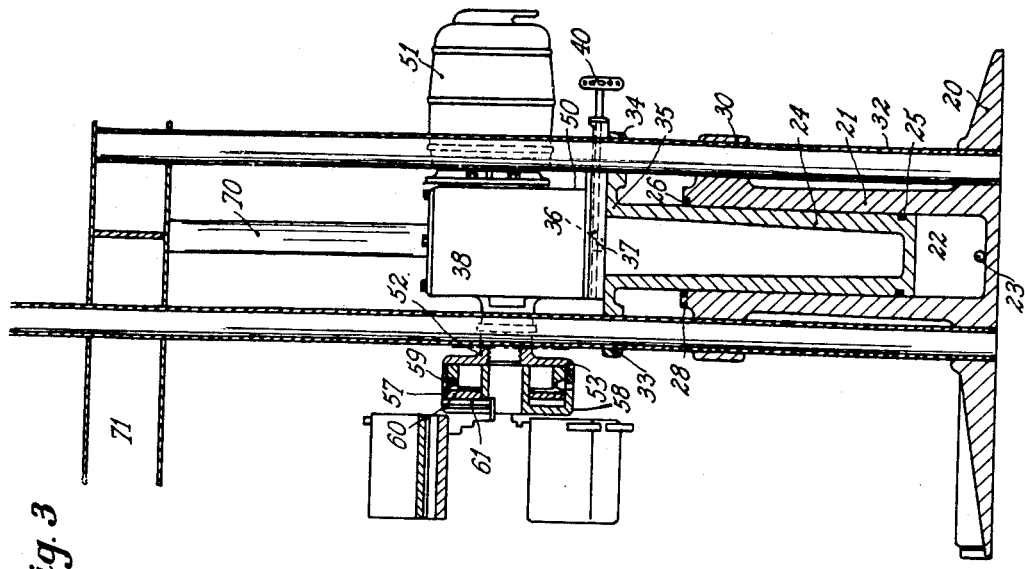

Jan. 3, 1956  R. ANTRAIGUE  2,729,269
MACHINE FOR RETREADING PNEUMATIC TIRES
Filed Jan. 22, 1953  5 Sheets-Sheet 1
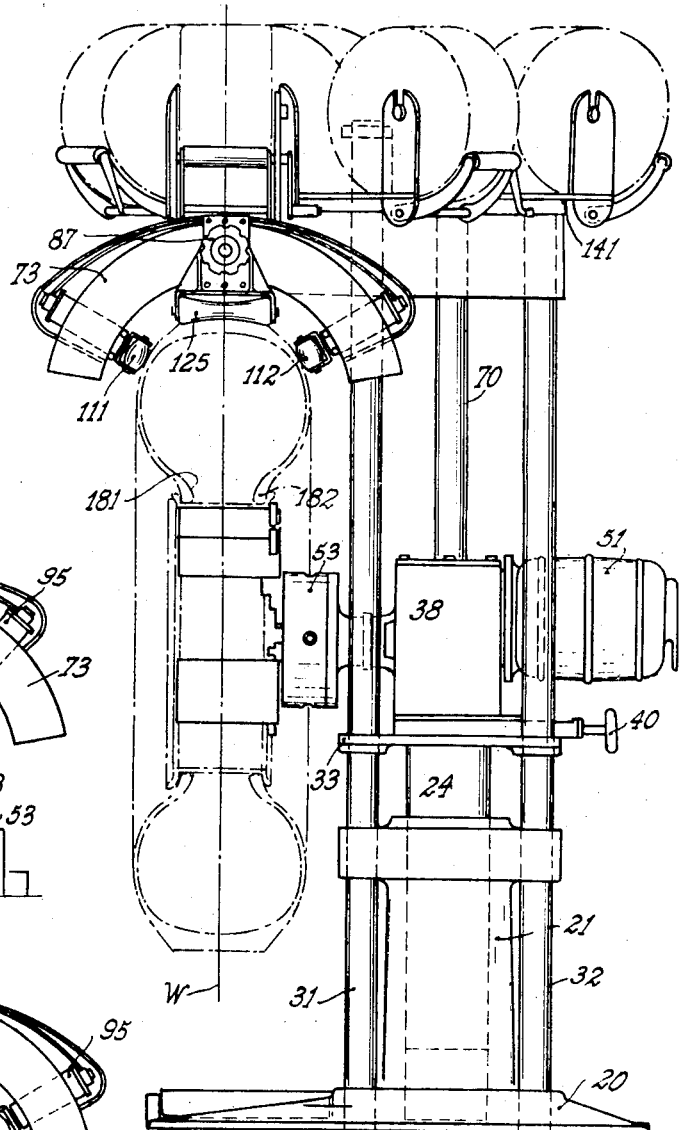
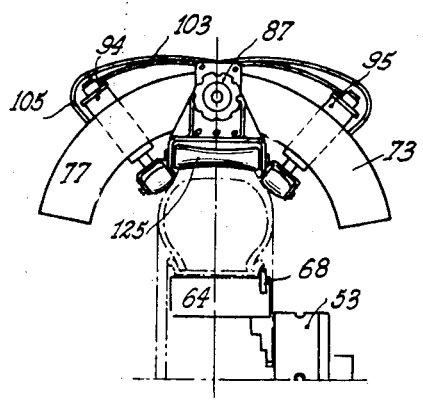
INVENTOR
ROGER ANTRAIGUE
BY
ATTORNEY

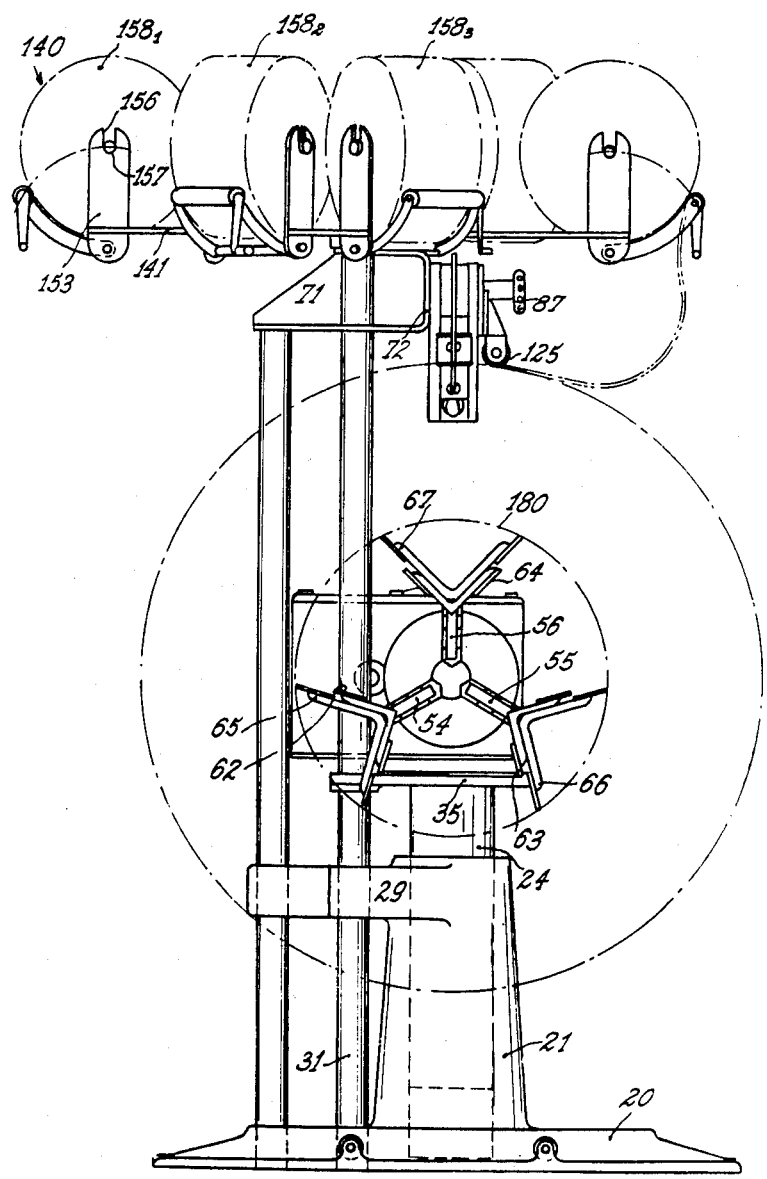

Jan. 3, 1956 R. ANTRAIGUE 2,729,269
MACHINE FOR RETREADING PNEUMATIC TIRES
Filed Jan. 22, 1953 5 Sheets-Sheet 3

INVENTOR
ROGER ANTRAIGUE
BY
ATTORNEY

Jan. 3, 1956 R. ANTRAIGUE 2,729,269
MACHINE FOR RETREADING PNEUMATIC TIRES
Filed Jan. 22, 1953 5 Sheets-Sheet 4
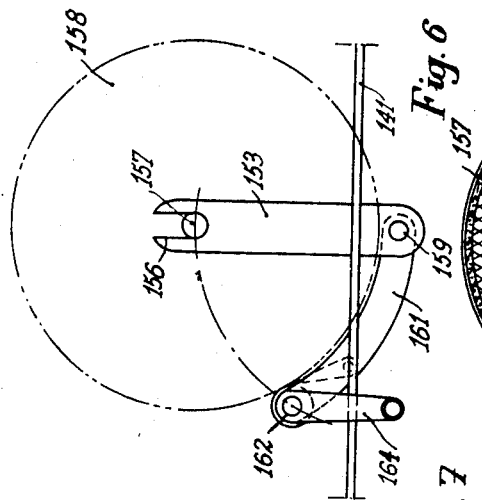
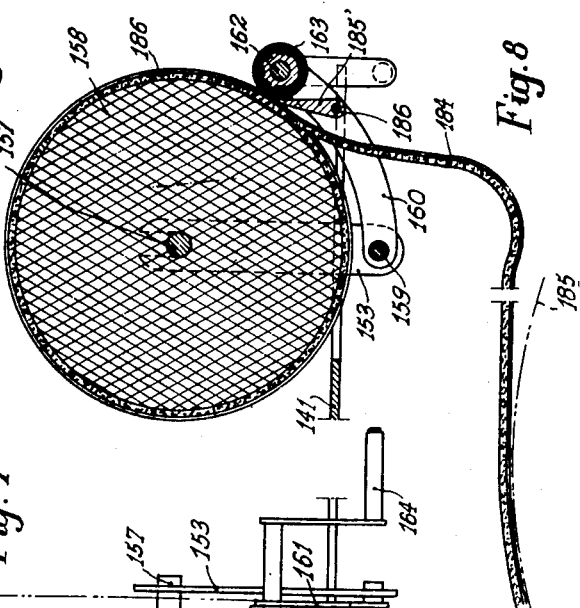
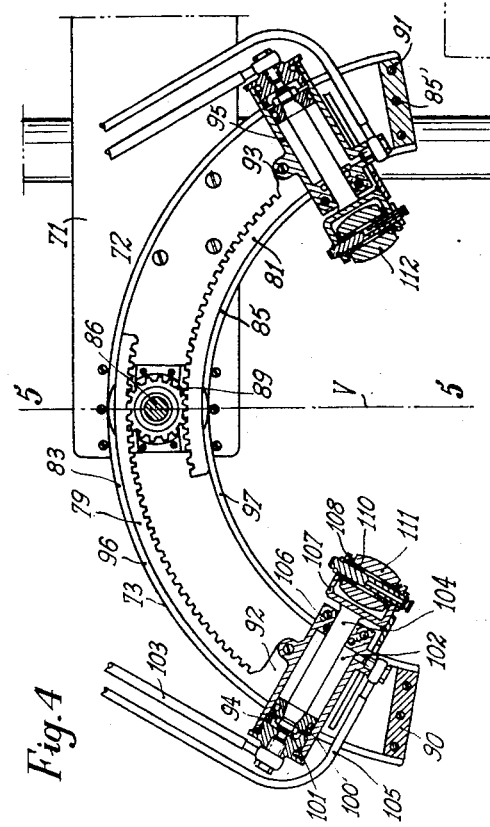
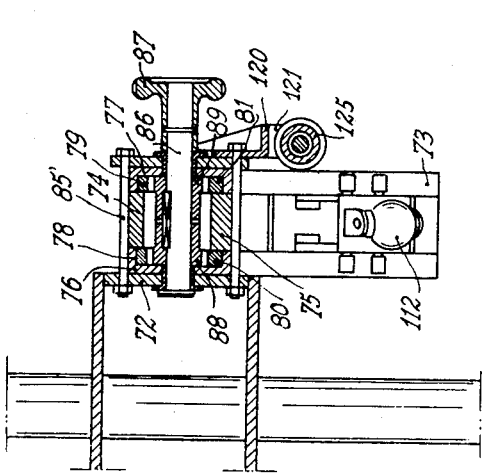
INVENTOR
ROGER ANTRAIGUE
BY
ATTORNEY Jan. 3, 1956  R. ANTRAIGUE  2,729,269
MACHINE FOR RETREADING PNEUMATIC TIRES
Filed Jan. 22, 1953  5 Sheets-Sheet 5
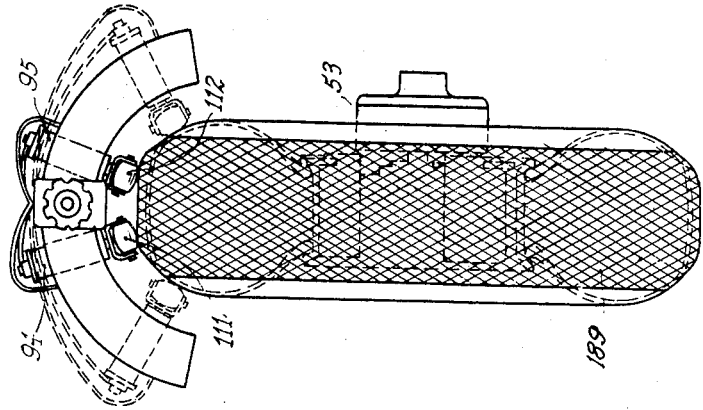
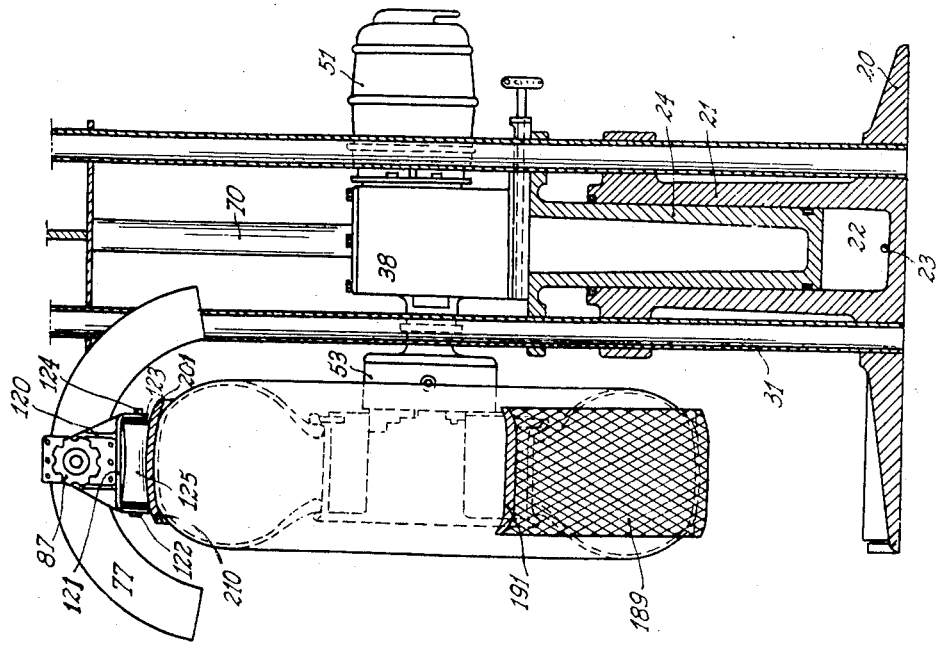
INVENTOR
ROGER ANTRAIGUE
BY
ATTORNEY United States Patent Office 2,729,269
Patented Jan. 3, 1956

2,729,269
MACHINE FOR RETREADING PNEUMATIC TIRES

Roger Antraigue, Paris, France

Application January 22, 1953, Serial No. 332,607

Claims priority, application France January 30, 1952

7 Claims. (Cl. 154—9)

The invention relates to a machine for retreading pneumatic tires.

It is an object of the invention to provide a machine whereby a tire casing may be retreaded without substantial manipulation of the tire.

Another object, therefore, of the invention is to provide a retreading machine whereby a retreading operation may be performed without requiring the exertion of strenuous force on the part of the operator, who thus will be able to operate more efficiently for longer periods of time.

A further object is to provide such a machine wherein manipulation of the retreading strip or band of raw rubber is eliminated.

Another object is to provide such a machine whereby a raw rubber retreading band formed into a roll in the conventional manner will be used integrally for retreading, thus eliminating any waste of retreading material.

Another object is to provide a machine whereby the retreading band is applied under a pressure having the most suitable value for the retreading process.

It is also an object of the invention to provide such a machine wherein the retreading band is applied under pressure over the entire transverse width of the band, thus effecting a good bond between the band and the tire.

Yet another object is to provide such a machine whereby air bubbles entrapped between the tire and the band, during application of the band, are completely eliminated, thus further strengthening the bond between the tire casing and the band or strip.

It is, accordingly, an object of the invention to provide a retreading machine which will provide an ideal bond between the tire casing and the new tread therefor, whereby a retreaded tire of exceptionally high quality may be produced.

It is also an object of the invention to provide a retreading machine adapted to handle tires of different diameters and which is readily adaptable to tires of different sizes.

It is a further object of the invention to provide a machine whereby tires of different cross sections may be retreaded, the quality of the work being in all cases excellent regardless of the particular cross section of the tire treated.

It is further an object to provide a retreading machine whereby retreading bands or strips may be used having the most suitable width in view of the size and condition of the tire to be retreaded.

It is, in this connection, an object to provide a machine adapted to apply to a tire a retreading band selected from amongst a plurality of bands having different widths or sections.

It is an object of the invention to provide a retreading machine adapted rapidly to complete a retreading operation.

It is an object to provide such a machine which shall be rugged and easy to operate without requiring a long period of training on the operator's part.

A machine according to the invention comprises two structures movable with respect to each other by hydraulic or other suitable operating means, one structure adapted to support the tire and the other provided with means adapted to apply to said tire a retreading band or strip.

The means used for applying the retread band comprise a roller device.

In one form of construction, said device comprises a central roller mounted for free rotation and supported by the second above mentioned one of said relatively movable structures. In this form of construction, there are preferably provided two further rollers, also supported from the said structures, for transverse displacement with respect to the median plane of the tire, means being provided for constraining the rollers to retain a symmetrical relationship to either side of said plane during their displacements.

The invention further contemplates the provision of means for causing said movable rollers to be at all times applied under pressure against the retreading band being applied to the tire, the direction in which the pressure applying the rollers against the band is exerted being at all times controlled so as to be exerted in the most suitable direction, and the value of said pressure being controllable at will.

The retreading machine of the invention possesses a further advantageous feature in that it may comprise a device of improved design for reeling off the retreading band, which device may comprise means for automatically taking up or winding the intermediate sheet element or strip interposed between adjacent layers or turns of the retread band.

In a preferred embodiment, the machine may comprise a plurality of such reeling devices, arranged on turntable, whereby the operator is able to select at will the particular retreading strip coil which corresponds in width to the tire to be retreaded.

Figure 13:
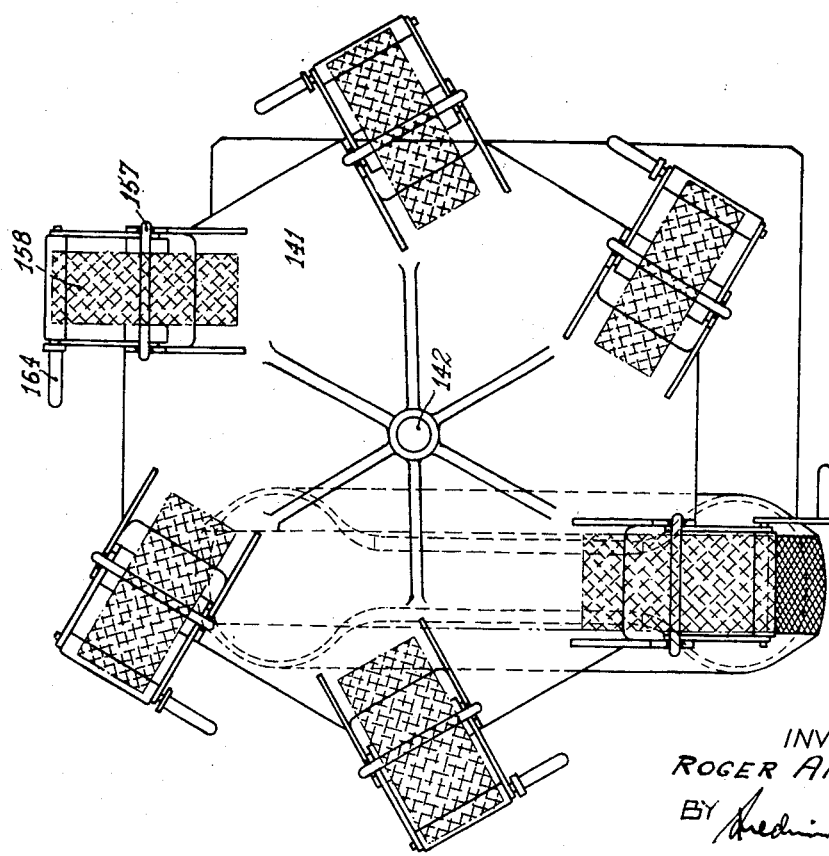

The above and further objects, features and advantages of the invention will be full understood from the ensuing disclosure of a preferred embodiment of an improved retreading machine described for purposes of illustration and not of limitation, with reference to the accompanying drawings, wherein:

Fig. 1 is a general view in side elevation;
Fig. 2 is a corresponding front view;
Fig. 3 is a view of the lower part of the machine in cross section;
Fig. 4 is a front view of an arcuate presser unit on an enlarged scale;
Fig. 5 is a cross sectional view on line 5—5 of Fig. 4;
Fig. 6 is an elevation, on an enlarged scale, showing a reeling device for a retreading coil;
Fig. 7 is an elevation on a plane at right angles to that of Fig. 6;
Fig. 8 is a cross section on line 8—8 of Fig. 7;
Fig. 9 is a showing of the machine during a retreading operation;
Fig. 10 is a partial view similar to Fig. 9 during another stage of the retreading operation;
Fig. 11 shows that portion of the machine adjacent the arcuate presser unit during a retreading operation;
Fig. 12 shows a view similar to Fig. 11 during a retreading operation applied to a different size tire; and
Fig. 13 is a plan view corresponding to Figs. 1 and 2.

As shown, an improved retreading machine comprises a heavy base 20 from which projects a centrally recessed standard 21, defining a cylindrical chamber 22. Opening into this chamber through a port 23 (Fig. 3) is a conduit, not shown, connecting with a source of fluid under constant pressure through a suitable control valve, of any well known type, adapted for selectively connecting the chamber 22 to the pressure source or to exhaust.

Slidably mounted within cylinder chamber 22 is a piston 24 extending over a comparatively great vertical length in said chamber and provided with a piston ring 25 adjacent its lower end; a seal ring 26 is moreover provided on the upper face 28 of post 21. Post 21 is formed with stout diametrically-opposed projecting ears 29 and 30 at its upper end, through which extend vertical pillars 31 and 32 secured to the base 20 and participating in the function of guiding the structure rigid with piston 24, for which purpose the upper end of the piston is formed with apertured flanges 33 and 34 slidable on the pillars.

Flanges 33 and 34 form part of a disc 35 constituting the upper end of piston 24 and having formed in the upper surface thereof a straight slot or groove 36, preferably of dovetail cross-sectional configuration, within which is slidably mounted a slideblock 37 integral with the casing of a speed reducer unit 38 mounted between pillars 31 and 32. A screw-and-nut device is operable from a handwheel 40 for manually displacing the reducer unit 38 bodily with the connected structure relative to disc 35, through the cooperation of a slideblock 37 with slide 36.

The reducer unit 38 has an input shaft projecting from its (as shown) right side 50 driven from an electric motor 51 and an output shaft 52 having secured thereon a chuck 53 of any suitable type such as that used as the work-carrier on lathes. The reducer unit 38 is provided for reducing the drive ratio from motor 51 to chuck 53; the unit 38 is of any suitable well-known construction and does not require description.

The chuck 53 as stated may also be conventionally constructed, and is adapted to allow radial displacement of radially extending chuck arms or jaws, shown as being three in number 54, 55, 56. In the exemplary construction shown, displacement of the chuck jaws is brought about by means of a suitable key or other tool, adapted for insertion into a hole 57 formed in the chuck casing 58, to rotate a pinion 59 meshing with the peripheral gear teeth of a disc 60 having formed in the forward or leftward face 61 thereof a spiral groove in which drive studs projecting from jaws 54—56 are drivably engaged.

Each chuck jaw terminates in a 90° V-shaped member 62, 63, 64, adapted to have removably mounted thereon extension V-members 65, 66, 67 which may, for example, be simply placed over the V-members 62—64.

Each arm of each of the V-members 54—56 and of the extension V-members 65—67, is provided adjacent its inward end with a stop; the stops provided on the arms of the members 64 and 67 are clearly visible at 68 and 69 on Fig. 11. The V-members 65—67 are formed with complementary notches for receiving the stops of the inner V-members over which they are applied.

Further upstanding from base 20 is a pillar 70, co-operating with pillar 32 to support a bracket 71. Secured on the vertical face 72 of the bracket is an arcuate casing member 73. This member is substantially rectangular in cross section, as shown in Fig. 5, with an upper wall 74, a lower wall 75 and two side walls or flanges 76 and 77. Casing 75 houses two pairs of gear segments or arcuate racks, a first pair comprising the upper gear segments 78 and 79, and the other pair comprising the lower segments 80 and 81. Each gear segment is received within an arcuate guideway, respectively 82—85, in which it is slidable. Each gear segment is substantially equal in length to one half the length of the arcuate casing 73 and both segments of each pair are symmetrically disposed to either side of the vertical mid plane of the casing. The side walls of the casings are assembled with bolts 85'.

Running through the casing is a shaft 86 extending between the gear segments, and having a handwheel 87 secured to its outer end and pinions 88 and 89 secured thereon within the arcuate casing. Pinion 88 meshes with gear segments 78 and 80 while pinion 89 meshes with gear segments 79 and 81. It will be seen that rotation of shaft 86 with handwheel 87 will cause one pair of gear segments to move in one direction, e. g. clockwise, and the other pair to move in the other direction, i. e. counterclockwise.

The pairs of gear segments are provided adjacent their inner ends, that is the ends thereof directed towards the end walls 90 and 91 of arcuate casing 73, with lugs 92 and 93 having secured thereto pneumatic cylinders 94 and 95 respectively, each cylinder being thus secured to both segments of a related pair. The cylinders are directed substantially with their axes extending along radii of the arcuate 73, and project as shown beyond the upper and lower walls of the casing 73 through apertures 96, 97. Movable in each cylinder is a piston 100 defining therein the chambers 101 and 102. The radially outer chamber 101 has connected therewith a conduit 103 and the radially inner chamber 102 which is that chamber through which the piston rod 104 extends, has a conduit 105 connected therewith. Piston rod 104 extends through the end wall 106 of the cylinder in sealing relationship therewith and is provided at its radially inward end with a stirrup or yoke member 107 the arms 108 and 109 of which serve to journal a pin 110 carrying a presser roller 111 formed with a convex outer surface, said pin thus being supported in a plane parallel to the axis of rotation of the tire casing to be retreaded. The arrangement just described applies both to the cylinder-and-piston unit situated on one side of the vertical mid plane V of casing 73 and to the similar cylinder-and-piston device situated on the other side of said plane.

Secured to the vertical face 77 of casing 73 centrally thereof is a bracket 120 having integrally depending therefrom a strap member 121 (Fig. 9), the arms 122 and 123 of which serve to journal freely therebetween a pin 124 of a roller 125 preferably provided with a concave peripheral contour as shown.

Further provided, at the top of the machine, and supported by the column or post 31, is a turntable 140 carried on a plate 141 mounted for rotation about a pivot 142. The plate 141 is notched and is provided with upstanding supports 152, 153, each formed at its upper end with a slot 155, 156 respectively (Figs. 6 and 8). The slots are adapted to receive a spindle 157 extending freely through the centre of a roll or coil 158 of a raw rubber retreading band or strip. The rolls $158_1$, $158_2$, $158_3$, etc., preferably comprise strips of different widths for a purpose hereinafter explained.

Mounted for rotation on the supports 152, 153 on a shaft 159 are a pair of arcuate arms 160, 161, supporting at their free ends a shaft having secured thereto a winding reel 163. Further secured on the shaft 162 is an operating crank 164. The arms 160 and 161 are urged against the coil 158 by suitable spring means, such as a spiral spring surrounding the shaft 159.

The machine operates as follows:

The tire to be retreaded is subjected to the usual preparatory treatment, including having its surface scraped and then coated with rubber solution over the area thereof which is to receive the new tread thereon. The tire thus treated is then passed over the chuck assembly 53, the additional removable V-members 65—67 being inserted or omitted depending on the inner diameter of the tire being processed, so that the inner circumference 180 of the tire (Fig. 2) will engage, or substantially engage, the ends of the V-members. The chuck assembly is then actuated by inserting a key into the opening 57 until the V-members are forced outwards against the tire beads 181, 182. The stops 68 or 69 as the case may be will preliminarily have served to ensure that the median plane of the tire is normal to the axis of rotation, and to position it correctly on the V-members.

The tire having thus been rigidly mounted upon the chuck assembly carrying the V-member supports, the operator then rotates the handle 40 until the median plane W of the tire substantially coincides with the median plane V of the arcuate member 73. The operator next actuates the pressure valve associated with cylinder 20, thereby causing the piston 24 to rise in the chamber 22 until the periphery 183 of the tire is applied against the concave central roller 125. If necessary, the position of the tire with respect to this roller is modified by actuating handle 40.

The operator then rotates the turntable 140 so as to bring a selected roll or coil 158 substantially into vertical alignment with the arcuate member 73, selection of the coil being made with reference to the contour of the raw rubber tread strip which the operator judges to be most suitable in view of the particular tire to be retreaded. He then pulls out a length of strip 184 from the selected coil and applies it against the part 185 of the tire then adjacent the arcuate member 73 (Fig. 8). The strip of paper or the like 186 which extends the raw rubber strip 184 is inserted between reel 163 and a knife or bevel member 185' rotatably mounted on a pin 186' between the arms 160 and 161, which member is applied by a spring, not shown, into engagement with the reel 163. The end of strip 186 is then coiled about said reel.

The operator then starts the electric motor 51, for example by depressing a pedal. The tire 190, supported on and driven by the V-members which, as stated before, are applied forcibly against the beads 181, 182, starts to revolve. If desirable the operator may manually adjust the initial engagement between the retreading strip 84 and the tire. The strip passes under the freely rotatable roller 125, which applies the strip under pressure against the periphery of the tire, the pressure being due to the forces exerted in the chamber 22 on the piston 25. After the tire has completed a revolution, the end 191 (Fig. 9) of the strip 184 assumes a position adjacent to the part of said strip which first engaged the tire. The operator then stops the motor 51, severs the retreading strip, a perfect joint being obtained owing to the action of roller 125. At this stage of the procedure, the marginal edges of the strip may still be found to protrude from the tire surface, as shown on Fig. 9.

The handwheel 87 is then operated to bring the cylinders 94, 95, to the position thereof nearest to the median plane V. Pressure is then applied to said cylinders by operating a distributor valve member of any suitable construction which need not be described since such distributor units are well-known in the art. The result of this is to apply the freely rotatable convex rollers 111 and 112 under resilient pressure against the new tread which has previously been applied. The operator then re-starts motor 51 and the tire with the new tread applied thereon, is caused to ride past the rollers 111 and 112. As the tire rides past the rollers, the operator rotates handwheel 87 to move rollers 111 and 112 away from the median plane V. The resulting pressure action, which progresses gradually from the mid plane towards the sides of the tire, promotes the expulsion of any air bubbles that may have been entrapped between the strip and the body of the tire. Moreover, owing to the wide span of the arcuate member 73, rollers 111 and 112 will ensure an effective application of pressure on the edges 200 and 201 of the strip 184, even in the case of very wide retreading strips.

Fig. 10 shows in dotted outline the position of the cylinders carrying the rollers 111 and 112 at the end of their circular path of travel for the application of pressure against the edges of the strip.

Simultaneously with the reeling off of the strip 184, the interposed paper strip 186 has been unreeled from the reel 163, which latter has turned by strictly the correct amount owing to the contact engagement with the coil 158 during its rotation. After the strip 184 has been cut off, the retreading operation being completed, the remainder of the coil is therefore in condition for retreading a further tire.

Figs. 11 and 12 schematically illustrate the manner in which the machine may be adapted for retreading tires of different sizes. As shown in Fig. 11, the tire is supported on two superimposed sets of V-members 62—67 and its position is determined by abutment of the rim against the stops 69. The rollers 111 and 112 have been shown in their extreme operating positions. The adjustment which the handle 40 makes possible is such that, when the rib or bead 182 has engaged the stop 69, the mid plane of the tire coincides with the previously defined median plane V.

According to Fig. 12, the same condition is achieved by bodily displacing with the handle 40 the entire structure carried by the piston 24. The rollers 111 and 112 have also been shown in their extreme operating positions, which differs from that assumed by them in the previously described instance owing to the smaller cross section of the tire. The tire here shown, having a smaller internal diameter, rests with the rim against the V-members 62—64 only, while V-members 65—67 are omitted.

In the form of embodiment hereinabove described, the tire is mounted on a rim which is rigidly mounted on the rotary supporting assembly. However, the invention may alternatively provide for a direct support of the tire by engagement of the tire beads with radial arms, preferably having V-shaped ends.

A tire to be retreaded using the machine of the invention may or may not be provided with an inner tube, which is inflated in order to impart greater stiffness or firmness to the tire.

The retreading strip of raw rubber applied on the tire is pressed thereagainst by rollers or the like which are freely rotatable on their axes and the rotation of the tire is accomplished by mounting the tire rigidly on a rotary assembly. These conditions ensure that the retreading strip is only stressed in compression and is not subjected to any drawing or extension stress.

Inasmuch as the tire is secured by means of its beads or equivalent parts, the invention avoids the drawback occurring with conventional compression systems using a metallic ball or "olive" inside the tire and a presser roller outside the tire, which drawback namely resides in the fact that the new tread or strip is locally thinned out at the location of a repair.

The improved machine provides a perfect bond between the tire and the new tread, with mutual penetration therebetween, prior to the vulcanization thereof, and thus leads to the production of retreaded tires of excellent quality.

As the raw rubber is provided strictly in accordance with the consumption and is protected till it is applied by the paper or the like, its oxidation is avoided.

After the requisite length of retreading strip has been applied, the excess length of strip may be easily taken up simply by rotating the coil back manually, whereupon said excess length becomes reinserted into the coil and protected by the interposed paper strip.

The invention may contemplate a modification to the above described construction wherein the tire support is mounted fixedly on the base and the retreading strip is applied by means of a presser unit urged against the surface of the tire by means of a compressed air piston or the like.

It will be understood moreover that many modifications may be made in the structural details of the single exemplary embodiment illustrated without exceeding the scope of the invention as defined by the ensuing claims.

What I claim is:

1. In an apparatus for securing treaded raw rubber material to the casing of a tire, in combination, rotary core means insertable in the tire casing in engagement with the inner periphery thereof, a displaceable support supporting said core means, guide means guiding said support in the direction of the rotational axis of said core means, hydraulic ram means for displacing said support along said guide means, a frame supporting said guide means, and roller means carried on said frame adjacent said core means and rotatable on axes parallel to the axis of rotation of the core means.

2. An apparatus as claimed in claim 1 in combination with means for displacing said core means along the axis of rotation thereof.

3. An apparatus for securing treaded raw rubber material to the casing of a tire, comprising a frame, means supporting a tire casing for rotation about its center axis, an arcuate member supported on said frame for encompassing a portion of the outer cross-sectional periphery of said casing, roller means slidably mounted on said arcuate member, and means for applying said roller means to said casing periphery with a predetermined pressure.

4. An apparatus for securing treaded raw rubber material to the casing of a tire, comprising means for supporting a tire casing for rotation about its center axis, roller means, and a hydraulic ram device supporting and actuating said roller means for pressing said roller means at predetermined pressure against a treaded raw rubber material overlying said casing to which the material is to be secured.

5. In an apparatus for securing a band of gum to the casing of a tire, in combination a frame, means carried on the frame for supporting a tire casing for rotation about its center axis, a slide carried on the frame adjacent to a cross-section of said casing, a slide-block cooperating with said slide, a roller-carrier member for sliding transverse movement relative to said slide and adapted to protrude a variable distance relative thereto, and a roller carried on said member.

6. In an apparatus for securing a band of raw gum to the casing of a tire, an arcuate slide, a first carriage coacting with said slide, a first pressure cylinder carried by said first carriage, a first piston slidable in said cylinder, a first roller carried on said piston, a second carriage coacting with said slide, a second pressure cylinder carried by said second carriage, a second piston slidable in said second cylinder, a second roller carried by said second piston, and means for imparting to said carriages equal and symmetrically opposite displacements in said slide with respect to the central diametric plane of said slide.

7. An apparatus as claimed in claim 6 in combination with an actuating member controlling the displacements imparted to said carriages, and speed-reducing means interposed between the said member and said carriages.

References Cited in the file of this patent

UNITED STATES PATENTS

| | | |
|---|---|---|
| 2,474,511 | Bacon | June 28, 1949 |
| 2,498,953 | Glynn | Feb. 28, 1950 |
| 2,521,728 | Kastner | Sept. 12, 1950 |
| 2,556,264 | Flynn | June 12, 1951 |
| 2,690,207 | Godfrey | Sept. 28, 1954 |